United States Patent [19]

Maeda

[11] Patent Number: 4,549,800
[45] Date of Patent: Oct. 29, 1985

[54] COMPACT AUTOMATIC FOCUSING LENS SHUTTER TYPE CAMERA

[75] Inventor: Keisuke Maeda, Osaka, Japan

[73] Assignee: Minolta Camera Kabushiki Kaisha, Toyonaka, Japan

[21] Appl. No.: 493,443

[22] Filed: May 11, 1983

[30] Foreign Application Priority Data

May 13, 1982 [JP] Japan .................................. 57-80966
Aug. 30, 1982 [JP] Japan ................................. 57-150454

[51] Int. Cl.[4] ............................................. G03B 3/00
[52] U.S. Cl. .................................. 354/400; 354/402; 354/288
[58] Field of Search ..................... 354/400, 408, 195.1, 354/403, 288, 402

[56] References Cited

U.S. PATENT DOCUMENTS 4,283,131  8/1981  Ohnuki et al. ................... 354/195.1
4,304,474 12/1981  Stein ..................................... 354/408
4,307,950 12/1981  Suzuki et al. ....................... 354/195
4,432,621  2/1984  Suzuki et al. ....................... 354/403

Primary Examiner—Russell E. Adams
Attorney, Agent, or Firm—Wolder, Gross & Yavner

[57] ABSTRACT

A compact 35 mm, automatic focusing camera of the lens shutter type includes a camera body having a camera obscura with a fast opening cartridge receiving and spool accommodating chambers on respective opposite sides of and extending above the camera obscura and a range finder located in the camera body spaced above the top of the camera obscura to delineate with the upper inside walls of the chambers and the top of the camera obscura a housing space. An objective lens registers with the camera obscura front opening and includes an axially movable focusing lens element. Disposed in the housing space is a flat lens control mechanism for shifting the focusing lens element, a first signal being produced in accordance with the focusing lens position, a second signal being generated by the range finder in accordance with the indicated range and a control signal responsive to the first and second signals for braking the control mechanism.

12 Claims, 11 Drawing Figures

COMPACT AUTOMATIC FOCUSING LENS SHUTTER TYPE CAMERA

BACKGROUND OF THE INVENTION

1. Field of the Invention

The present invention relates to an improved 35 mm lens shutter type camera provided with automatic focusing, and it relates more particularly to an improved camera of the aforesaid type which is highly compact in size.

2. Description of the Prior Art

In 35 mm lens shutter type cameras which are provided with automatic focusing mechanisms and which are now on the market, a lens position control device for axially moving the focusing lens elements of the objective lens system and for stopping the movement of these lens elements is located around the objective lens projecting from the camera body (see, for example, U.S. Pat. No. 4,307,950). Hence, the diameter of the objective lens barrel is consequently very large as is the height of the camera body since the range-finding optical system and the viewfinder optical system are located above the objective lens barrel and remote therefrom such that these optical systems are not blocked by the lens barrel.

The more compact a camera is, the more desirable it is for its convenience in hand carrying. Thus, such cameras should be as compact as possible. However, in the case of the 35 mm lens shutter type camera with automatic focusing, the arrangement and the location of the lens position control mechanism, that is essential to this kind of camera, was one of the main factors preventing suitable compactness in this kind of camera, for which the achievement of great compactness has been delayed in comparison with other 35 mm lens shutter type cameras lacking the automatic focusing function.

SUMMARY OF THE INVENTION

An object of the present invention is to provide an improved 35 mm lens shutter type camera capable of automatic focusing and being highly compact in size as compared with conventional cameras of like kind.

Another object of the present invention is to provide an improved automatic focusing camera in which the various mechanical components and mechanisms are efficiently and effectively assembled.

Still another object of the present invention is to provide a lens position control device, essential to the aforesaid type of camera, of maximum compactness and flatness.

The above and other objects of the present invention will become apparent from the following detailed description of an embodiment thereof taken in conjunction with the accompanying drawings.

DESCRIPTION OF THE PREFERRED EMBODIMENT

Figure 1:
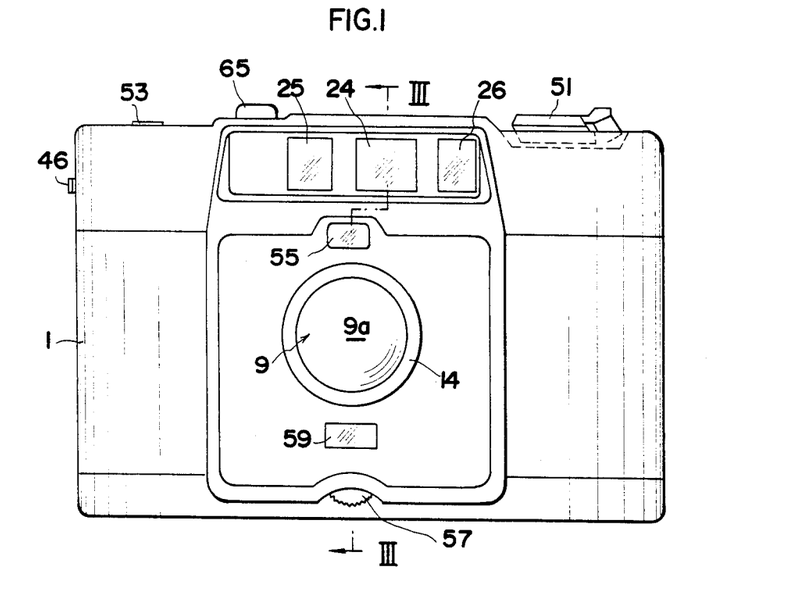
FIG. 1 is a front elevational view of a camera according to a preferred embodiment of the present invention.
Figure 2:
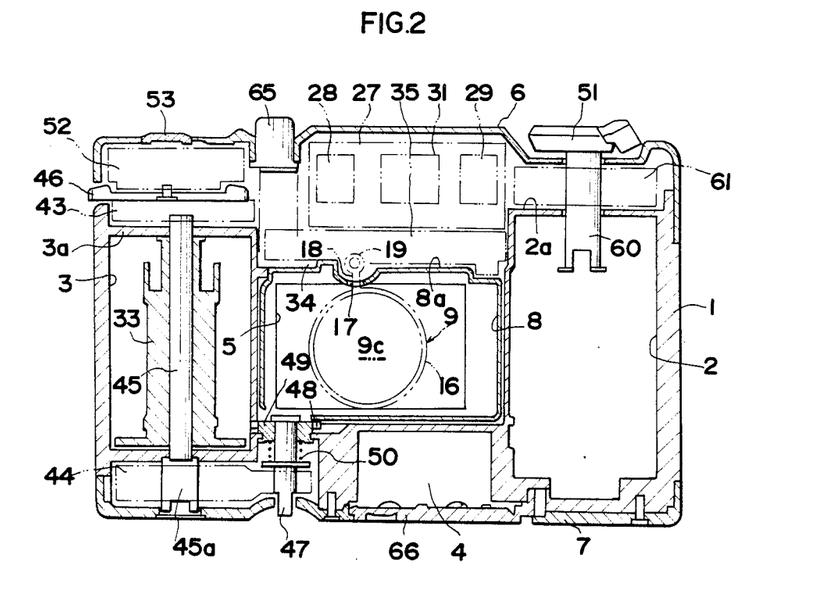
FIG. 2 is a cross sectional view of the camera taken along a vertical plane laterally extending approximately at the center of the camera with respect to the direction from the front to the rear thereof.
Figure 3:
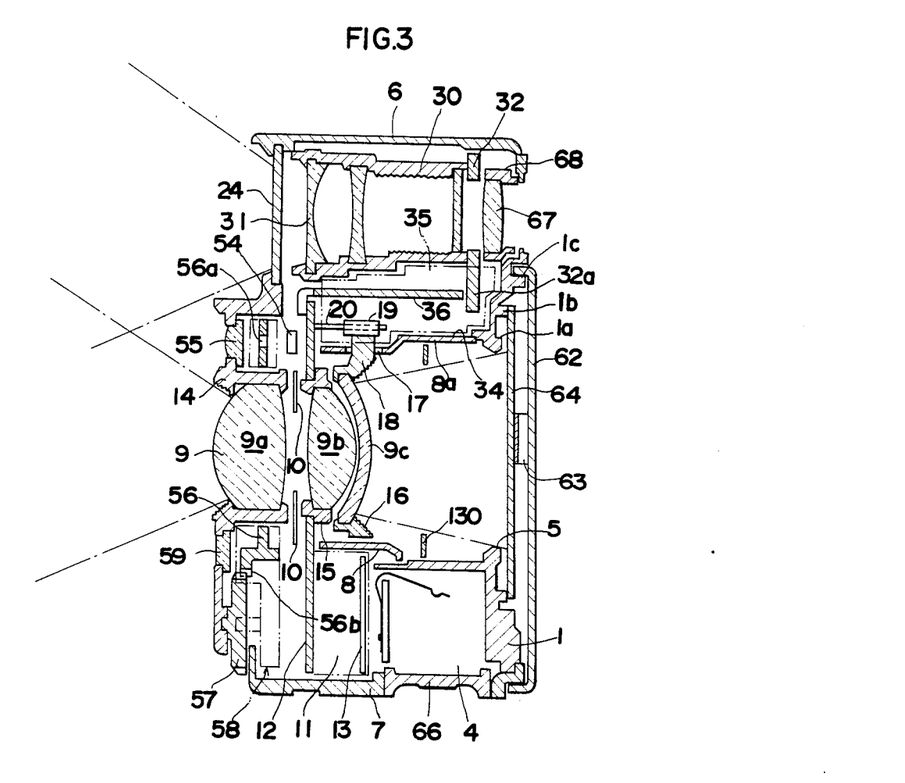
FIG. 3 is a slightly enlarged cross sectional view taken along line III—III in FIG. 1.

Considering now the preferred embodiment of the present invention and referring particularly to FIGS. 1 through 3, a camera body 1 is molded of a synthetic resin material and is formed with a film cartridge chamber 2, a spool accommodating (or containing) chamber 3, a battery receptacle 4 and an exposure window or aperture 5. A top cover 6 and bottom cover 7 are fixed to the top and bottom of the camera body 1 respectively. Between the cartridge chamber 2 and the spool chamber 3 is secured a dark box or camera obscura 8 which is open at its front and rear, and houses at its front portion the rear lenses 9b and 9c of a photographic objective lens 9 which is composed of a front element 9a and the rear elements 9b and 9c.

Between the front element 9a and the rear elements 9b and 9c are disposed shutter blades 10 whose opening and closing operation is controlled by an electric shutter device 11 mounted on a shutter supporting plate 12 located in the front portion of the camera obscura 8 within the camera body 1.

At the back of the electric shutter device 11 is located a circuit board 13 carrying circuits for the automatic exposure control. The front element 9a is fixedly supported by a forwardly projecting lens barrel portion 14 of the camera body 1, while the front lens element 9b of the rear elements is fixedly supported by a mounting frame 15 secured to the shutter supporting plate 12. On the other hand, the rear lens element 9c of the rear elements is supported by a mounting frame 16 having a tubular or cylinder member 19 at the free end of a first arm 18 which extends from frame 16 through an axial slit 17 in the upper wall 8a of the camera and projects from the camera 8. The cylinder member 19 is engaged and supported by a guide rod 20 passing therethrough and mounted in parallel with the optical axis of the objective lens such that the rear element 9c is movable in a direction parallel to the optical axis and is forwardly biased under the influence of a spring.

It is to be understood that, in the present embodiment, the focusing of the objective lens 9 is adjusted by the axial movement of the rear lens element 9c which serves as a focus adjusting lens and is forwardly biased. Supporting frame 16 is also axially guided by another guide rod 23 (FIG. 4) which is parallel with the optical axis and located at the rear of the shutter supporting plate 12 and which passes through the forked portion 22 at the end of a second arm 21 formed on the supporting frame 16 at a position offset from first arm 18. With this construction, the supporting frame 16 is prevented from rotating about the guide rod 20.

A viewfinder window 24 and range finder windows 25 and 26 are disposed above the objective lens barrel 14 of the camera body 1. The range finding windows 25 and 26 are located on opposite sides of the viewfinder window 24, being spaced apart from each other by a predetermined base length. A range finder device 27 for measuring or detecting a camera-to-object distance through the range finding windows 25 and 26 is disposed within the camera body 1 and above the camera 8. The range finder device 27 is provided with range finding optical systems 28 and 29 and photoelectric range finding elements (not shown). A base 30 supporting optical systems 28 and 29 also supports a viewfinder optical system 31 positioned at the back of the viewfinder window 24, and has fixed to its back (or rear) surface, a circuit board 32 including a electric circuit (not shown) of the range finder device for processing the outputs derived from the above mentioned photoelectric range finding elements and generating range finding signals.

Spool chamber 3 is formed with its upper wall 3a at a lower level than that of the upper wall 2a of the cartridge chamber 2 because the height thereof is constructed as short as possible by minimizing the axial or longitudinal dimension of the spool 33 to a length which is almost the same as or slightly larger than the width of the film. The range finder device 27 is located on a plane generally in alignment with the upper wall 3a. Camera 8 is formed with its upper wall 8a at a level lower than that of the upper wall 3a of the spool chamber 3. With such structure, the height of the camera body 1 is considerably reduced, leaving a space 4 delineated by the camera 8, the range finder device 27 thereabove, and cartridge chamber 2 and spool chamber 3 on both sides of the camera body. The space 34 accommodates the lens position control device 35.

Figure 4:
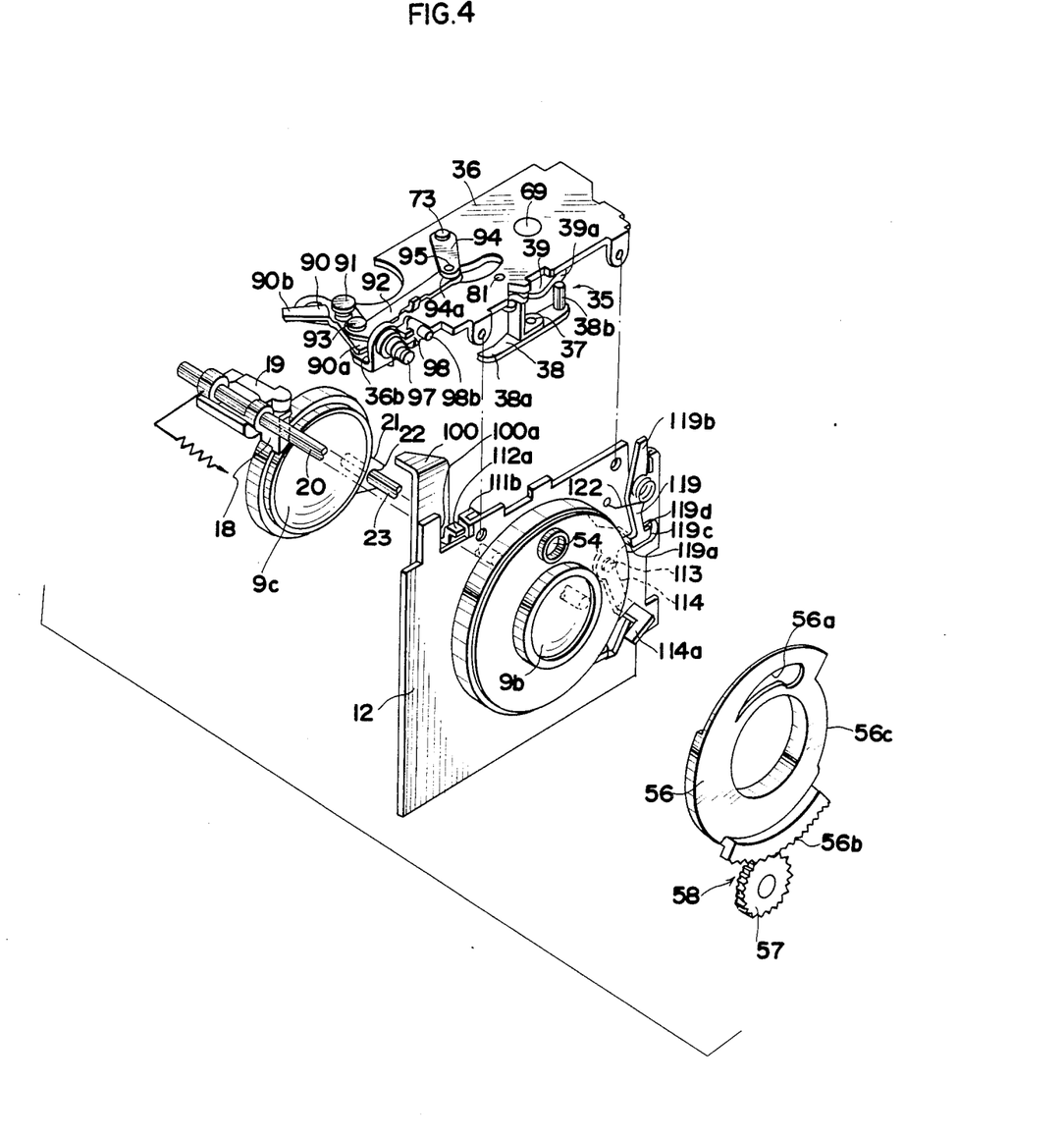
FIG. 4 is an exploded perspective view of an essential portion of the camera.
Figure 5:
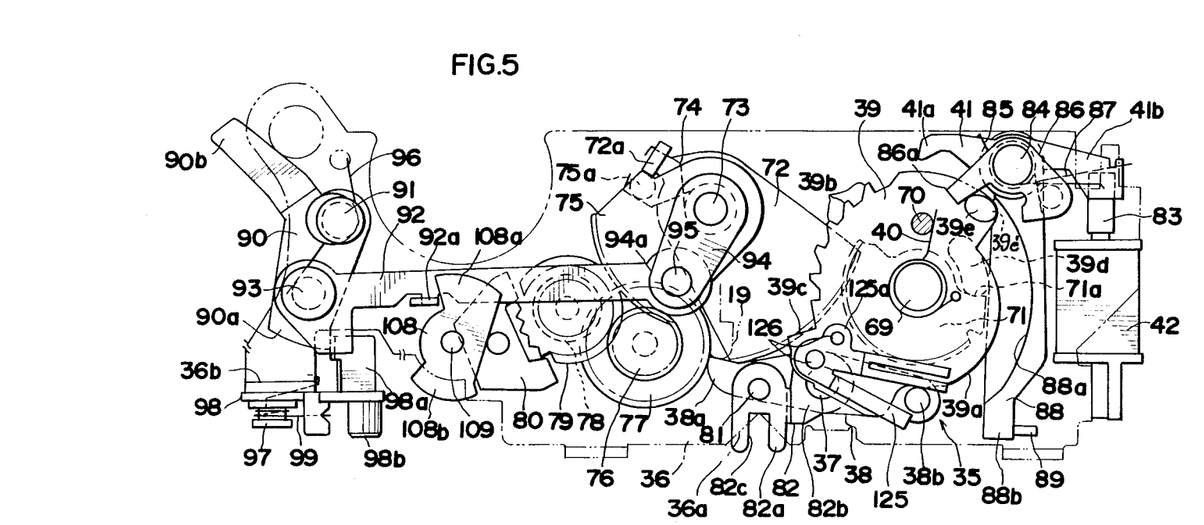
FIG. 5 is a plan view of the lens position control mechanism.
Figure 6:
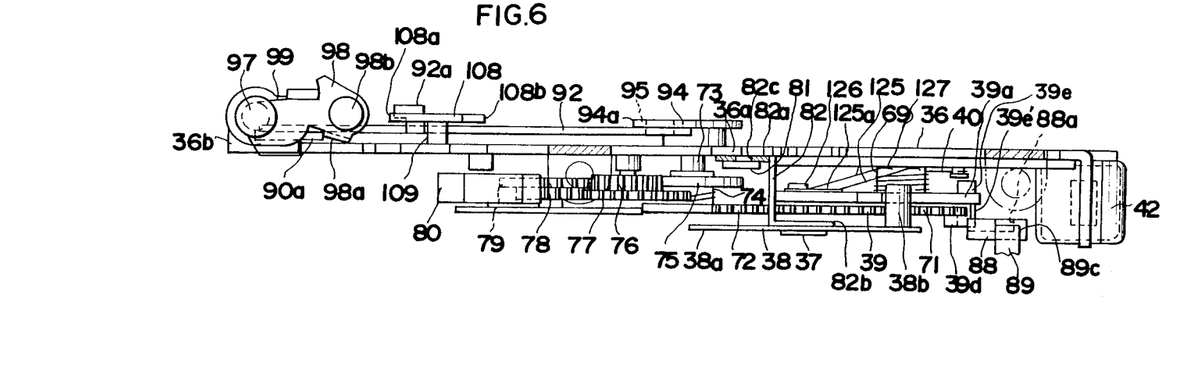
FIG. 6 is a front elevational view of the mechanism shown in FIG. 5.

The lens position control device 35 comprises a base plate 36 which is fixed to the top of the shutter supporting plate 12, extending horizontally rearwardly, and which carries other parts of the lens position control device 35 as a module or unit. As shown in FIGS. 4 to 6, the lens position control device 35 includes a control lever or interlocking member 38, a lens position control cam plate 39, a spring 40 for rotationally driving the control cam plate 39, a detent member 41 for restraining or arresting the control cam plate 39, an electromagnet 42 for actuating the detent member 41, and others (see FIGS. 4 to 6). The interlocking member 38 is rotatably supported on the base plate 36 by a vertical pin or stud 37 which extends perpendicularly to the optical axis. An operating (or acting) end portion 38a of the interlocking member 38 engages, from the side of shutter supporting plate 12 with respect to the direction of the optical axis, the cylinder member 19 which is integral with the focus adjusting lens 9c. The lens position control cam plate 39 is pivoted on the base plate 36 by a vertical stud or pin 69 which extends perpendicularly to the optical axis. The lens position control cam plate 39 is formed with a peripheral cam 39a which is engaged by a follower pin 38b of the interlocking member 38 to allow the forward movement of the focusing lens element 9c along the optical axis through the interlocking member 38. Electromagnet 42 actuates the detent member 41 and stops the axial movement of the focusing lens element 9c in response to a range finding signal from the range finder device 27.

The circuit board 32 of the range finder device 27 has a portion 32a at its lower end extending into the space within the lens position control device 35 as shown in FIG. 3, facilitating the electrical connection of the electromagnet 42 and an electronic circuit (not shown) formed on the circuit board 32. Any required adjustment of the relative positions of the objective lens 9 and the lens position control device 35 is facilitated by the structure in which the whole of the lens position control device 35 is integrally coupled to the shutter supporting plate 12 by means of the horizontal base plate 36. The lens position control cam plate 39 may control the position of the focusing lens element 9c by engaging the interlocking member 38.

An upper film wind-up mechanism 43 and lower film wind-up mechanism 44 are located outside of the spool chamber 3 but within the camera body 1 and both mechanisms are linked with film wind-up shaft 45. The upper film wind-up mechanism 43 is provided with an externally operable or manipulatable film wind-up knob 46. The lower film wind-up mechanism 44 is interlocked by way of a clutch (not shown) with a rotatable shaft 47 which serves also as a film rewind button. The rotatable shaft 47 is coupled to a rotatable member 49 which is integral with a film advancing sprocket 48, by means of a vertical key and key slot such that they can relatively move axially but rotate as an integral unit. A spring 50 urges the rotatable shaft 47 to normally project outside of the bottom cover 7, the rotatable shaft 47 being interlocked with the lower film wind-up mechanism 44 by the aforementioned clutch only in the projecting condition thereof. The film wind-up shaft 45 extends vertically through the spool chamber 3 and the spool 33 therein to be coupled with the upper and lower film wind-up mechanisms 43 and 44 and is friction coupled with the spool 33 by a spring (not shown). The film wind-up shaft 45 is integrally formed, at its lower end with a coupler 45a, which is coupled with a driving shaft of a detachable motor winder unit (not shown) when the latter is attached to the bottom of the bottom cover 7.

With this construction, film wind-up shaft 45 is rotated by a manual film wind-up operation by means of film wind-up knob 46 or an automatic film wind-up operation by means of the winder. When this occurs, the shaft 45 drives and rotates, in linked relationship, the rotatable shaft 47, the rotatable member 49 and the sprocket 48 to wind-up the film fed by the sprocket 48 around the spool 33 on the wind-up shaft 45. When the rotatable shaft 47 commonly used for rewinding, is depressed inwards against the force of spring 50, the interconnection between the rotatable shaft 47 and the lower film wind-up mechanism 44 is released by means of the clutch (not shown) to cause the rotatable shaft 47, the rotatable member 49 and sprocket 48 to be freely rotatable and enable the film rewinding by means of a rewind knob 51 disposed on the side of the film cartridge 2.

A one-way clutch mechanism (not shown) is provided between the film wind-up knob 46 and the upper film wind-up mechanism 43, as is well-known in the art, and a film frame counter mechanism 52 is disposed above the upper film wind-up mechanism 43. The top cover 6 is provided with a transparent window 53 which is positioned above a frame counter plate (not shown) included in the film counter mechanism 52.

On the camera body 1 about the front lens element 9a of the objective lens 9 are arranged a light receiving element 54 and its light receiving window 55 for automatic exposure control, and a film speed setting mechanism 58 including a film speed setting plate 56 formed with an aperture of a restricting opening 56a for receiving light, for restricting, in accordance with a set film speed, the amount or fraction of the light incident on the light receiving element 54 through the light receiving window 55, and a film speed setting knob 57 for the external manipulation of the film speed setting plate 56. The film speed setting knob 57 extends, with a portion thereof, outside of the camera body 1 and is formed, at its portion within the camera body 1, with a gear meshing a sector gear 56b formed on the periphery of the film speed setting plate 56. The front wall of the camera body 1 is provided with a transparent window 59 located in front of a film speed indicating or graduations plate included in the film speed setting mechanism 58. The shutter supporting plate 12 supports the aforementioned light receiving means 54 along with the electric shutter device 11 to form a shutter block (see FIGS. 4 to 6).

A film rewind shaft 60 of a film rewind knob 51 extends into the upper portion of the film cartridge chamber 2 to be coupled or connected to the film shaft of a film cartridge, and is interconnected by sliding with a film rewind mechanism 61 provided above the film cartridge chamber 2. At the rear of the camera body 1 is provided an access affording rear cover 62 which may be opened and closed. The rear cover 62 is provided with, and carries on its interior surface, a film pressure plate 64 by means of a resillient member 63 being interposed therebetween. A shutter release button 65 and a cover 66 for the battery receptacle 4 are provided respectively on the top and bottom of the camera body 1. The eyepiece lens 67 of the viewfinder optical system 31 is carried by a supporting frame 68 which is mounted on the camera body 1. Alternatively, the eyepiece lens 67 may be mounted on the circuit board 32.

With the above described improved camera construction, the lens position control device 35 is not positioned around that portion of the camera projecting forwardly from the front wall of the camera body 1 (i.e., the front lens element 9a in the present embodiment), but is disposed in the space 34 within the camera obscura body and surrounded by the camera or dark box 8, the range finder device located thereobove, and the film cartridge chamber 2 and the spool chamber 3 located at respectively opposite sides so that that the diameter of of the lens barrel portion is not enlarged and effects a compactness of the camera body in this respect. As a result of this arrangement, the range finder device 27 can be arranged close to the objective lens 9. Additionally, the range finder device 27 is located on the plane generally coplanar with the upper wall 3a of the spool chamber 3 which is at a lower level than the upper wall 2a of the film cartridge chamber 2. Further, the lens position control device 35 is disposed in the space surrounded by the following: the range finder device 27 located as described above, the portion of the spool chamber 3 at the lower elevation as described above, the film cartridge chamber 2 and spool chamber 3. Thus, the height of the camera body is also greatly minimized.

The camera body 1 has a portion 1a providing a gap between the portion 1a and the film pressure plate 64 to allow the film to traverse the gap, an abutting portion 1b against which the film pressure plate bears, and the portion 1c forming a light tight structure together with the rear cover 62. Furthermore, the viewfinder optical system 31 is disposed above such portions of the camera body 1. Therefore, a width of a space will necessarily appear below the viewfinder optical system 31 and above the effective photographic light path from the objective lens 9 to the exposure aperture 5. With the above described arrangement, the size of camera 8 is minimized without interferring with the photographic light path. The space above the effective photographic light path is partitioned from the camera 8, and the lens position control device 35 is disposed in the space 34 above the upper wall 8a of the camera 8 that is at a lower level than the upper wall 3a of the spool chamber 3. Thus, the space 34 for accommodating the lens position control device 35 is obtained between the camera 8 and the range finder device 27 disposed at a lower level than in conventional cameras. This results in a maximum reduction of the camera body height.

In the case of conventional 35 mm lens shutter type cameras with automatic focusing, a range finder device is located remote from the photographic objective lens, with the viewfinder optical system being disposed at the level of the range finding optical system. This results in the height of the camera body being considerably large in comparison with the present structure arranged and described above. Additionally, the space in conventional cameras that corresponds to the space 34 where the lens position control device 35 is located in the present structure extends increasingly upwards and is not effectively used. It is left as a dead space where only the circuit board and the guide rods for guiding the focusing lens element of the photographic lens are arranged.

In contrast thereto, the arrangement and the construction of the present camera makes efficient use of the space as much as possible to greatly reduce the height of the camera body in comparison with the conventional cameras. Moreover, unreasonable parts exchange does not occur wherein the lens position control device 35 occupies a space, and other mechanisms to be originally disposed in that space must be located in other positions. Thus, the compactness of the camera is positively achieved without any drawbacks.

In particular, the lens position control device disposed in the space 34 is constructed such that a member integral with the focusing lens 9c engages, through interlocking member 38, the peripheral cam 39a of the lens position control cam 39 which is pivoted by the stud 69 extending perpendicularly to the optical axis. This controls the axial position of the focusing lens 9c by controlling the rotational or angular position of the cam plate 39 in accordance with a range finding signal. Accordingly, the lens position control device is of generally flat configuration, and the flatness is further advantageous in the disposition of the control device in the space 34 within camera body 1, attaining the compactness of the camera body. Additionally, as the interlocking between the lens position control cam plate 39 and focusing lens 9c is reliably accomplished, the lens position control is attained with high accuracy and stability.

Considering the construction of the preferred embodiment in greater detail, in the lens position control device 35, the lens position control cam plate 39 is urged or biased to rotate clockwise (as viewed in FIG. 5) in the charged condition shown in FIGS. 4 to 6, under the influence of spring 40 tensioned between the cam plate 39 and a fixed pin 70 on the base plate 36 and wound around stud 69. Spaced from the periphery cam 39a of the lens position control, the periphery of the cam plate 39 is formed with detent or rachet teeth 39b which are engaged by the pawl or engaging portion 41a of the detent member 41 when the latter is actuated during the clockwise rotation of the cam plate 39 under the force of spring 40, to thereby stop the cam plate 39. The cam plate 39 is further formed with a radial shoulder or engaging edge 39c which engages the engaging portion 41a of the detent member 41 at its stopped position when the latter is not actuated during the clockwise rotation of the cam plate 39, to thus restrict the terminal clockwise-rotational position of the cam plate. Under the lens position control cam 39 is provided a gear 71 with a non-toothed portion. The gear 71 is mounted on the common stud 69 to rotate coaxially with but independently of the cam plate 39.

Lens position control cam plate 39 is interlocked with the partially-toothed gear member 71, with its interlocking pin 39d engaging a shoulder or stepped portion 71a formed on the periphery of the partially-toothed gear member 71 under the force of spring 40.

The partially-toothed gear member 71 is interlocked through first and second sector gears 72 and 75, a small diameter intermediate gear 76 meshing the second sector gear 75, a large diameter intermediate gear 77 integral with the gear 76, and gear 78 meshing the gear 77, with an escapement wheel 79 such that the rotational speed of the lens position control cam plate 39 under the force of spring 40 is governed at a desired value by the escapement wheel 79 and an anchor 80 engaging the wheel 79. The partially-toothed gear member 71 engages the first sector gear 72 which is coaxially mounted by stud 73 on the base plate 36 to rotate independently of the gear 75. The second sector gear 75 is interlocked with the first sector gear 72 with the upwardly extending tab 72a of the latter, being engaged by interlocking pin 75a of the second sector gear 75 under the action of a spring 74 wound around stud 73 and acting on the tab 72a and the pin 75a.

The interlocking member 38 is rotatably supported on the base plate 36 by the stud 37 through adjusting plate 82 which carries the stud 37 on the lower end 82b thereof and which has an upper end 82a pivotally supported by a vertical stud 81 on the bottom face of the base plate 36. The adjusting plate 82 is formed, at its upper end 82a, with an opening or open slot 82c which is in alignment with a V-shaped notch 36a in base plate 36, allowing a screw driver or another similar tool to be inserted into the notch 36a to rotate the stud 37 about the stud 81 and change the position of the pivotally supporting point of the interlocking member 38 by the displacement of the stud 37 so that the position of the focusing lens element 9c in the direction of the optical axis is finely adjusted relative to the angular position of the lens position control cam plate 38.

The detent member 41 carries at its end portion 41b an armature 83 which is atractable by electromagnet 42. The detent member 41 is pivotally supported by a stud 84 on the base plate 36 and is normally urged counterclockwise by a spring 85 which is wound around the stud 84 and tensioned between the base plate 36 and the detent member 41. An urging lever 86 is also supported by the stud 84 to rotate coaxially with but independently of the underlying detent member 41. Under the charged condition as shown in FIGS. 4 to 6, the urging lever 86 is rotated clockwise as viewed in FIG. 5 with its action-receiving end portion 86a being pushed by an operating pin 39e carried on the upper surface of the lens position control cam plate 39, so that a spring 87 wound around the stud 84 and tensioned between the urging lever 86 and the detent member 41 is charged to urge the detent member 41 in the clockwise direction overcoming the force of the spring 85 and retaining the detent member 41 in the condition where the armature 83 is in pressed abutment with the electromagnet 42.

The electromagnet 42 is fixed on one end of the base plate 36. The lens position control cam plate 39 carries on its upper surface an insulating support 125a which supports a slide contact 125 and is fixed on the plate 39 by securing means 126 such as screws. Under the base plate 36 is located a print board 127 bearing a plurality of fixed contacts to be selectively engaged by the slide contact 125 in correspondence with the adjusted position of the focusing lens element 9c. With this construction, the slide contact 125 successively comes into contact with the plurality of fixed contacts with the axial movement of the focusing lens element 9c caused by the rotation of the lens position control cam plate 39 so that electric signals representative of the shifted position of the focusing lens elements 9c are applied to the range finder device 27. The range finder device 27 compares the electric signals relating to the moved position of the focusing lens element 9c with the electric signal relating to the camera-to-object distance and produces a range finding signal.

In response to the signal from the range finder device 27, the electromagnet 42 is transferred from its energized to its de-energized state upon arrival of the focusing lens element 9c at the in-focus position, to release the attraction of the armature 83 that has been attracted in the charged condition. At this time, the detent member 41 has been released from the influence of spring 87 in the clockwise direction in conjunction with the start of the clockwise rotation of the lens position control cam plate 39 from the charged position shown in FIG. 5 in the clockwise direction for shifting the focusing lens element. As a result, the detent member 41 is rotated by the spring 85 in the counterclockwise direction so that its engaging portion 41a is brought into engagement with the teeth 39b of the lens position control cam plate 39 to stop the axial shifting of the focusing lens element 9c.

Beside the lens position control cam plate 39 is mounted a distance responsive lever 88 which is rotatably and independently supported by the stud 84. The distance responsive lever 88 engages pin 39e which is carried on the rear surface of the lens position control cam plate 39 concentrically with the operating pin 39e. The distance responsive lever 88 is formed with a cam surface 88a to assume an angular position in accordance with the point of engagement of the cam surface with the pin 39e'. In the condition for normal or daylight photography other than flash photography, the cam surface 88a is retracted from the locus of the rotation of the operating pin 39e'. When the mechanism is switched from the normal to a flash photography condition, a distance signal lever 89 is turned to be brought into engagement with the lever 88 and push the latter to a position in the locus or path of rotation ot the operating pin 39e' to be engaged thereby. At the end portion of the base plate 36 opposite the end where the electromagnet 42 is secured, a charge lever 90 is supported by pin 91.

The charge lever 90 has its operating end 90a connected with one end of a charge linkage rod 92 by pin 93. The other end of the charge linkage rod 92 is connected by a pin 95 to an end 94a of a linkage lever 94 which is pivoted to the common stud 73 and is integrally coupled with the second sector gear 75 by the stud 73. Thus, the charge lever 90 is interlocked with the second sector gear 75. The charge lever 90 is urged in the counterclockwise direction by a spring 96 tensioned between the base plate 36 and the charge lever 90 and its passive end 90b extends into the upper film driving mechanism 48 shown in FIG. 2 so that the charge lever 90, at the charged condition shown in FIGS. 4 to 6, is turned clockwise in response to a film wind-up operation against the influence of spring 96 and accompanying the second sector gear 75 to bring the lens position control device 35 into a charged condition as shown in FIGS. 4 to 6.

The charged condition of control device 35 is maintained by a detent lever 98 which restrains the charge lever 90 at its charged position and which is pivotally supported on an upstanding tab 36b at the front edge of a charge lever supporting portion at one end of the base plate 36, by a horizontal stud 97 extending parallel with the optical axis. The detent lever 98 is urged in the counterclockwise direction as viewed in FIG. 6, by a spring 99 wound around the stud 97 and tensioned between the lever 98 and the base plate 36, and carries a passive pin 98b which projects in the opposite direction from end portion retaining piece 98a and which extends into the locus or path at the depressed movement of the shutter release button 65 along with a shutter plate 100 interlockable with the latter. When the shutter release button 65 is not depressed, the detent lever 98 is at the restraining position shown in FIGS. 4 to 6 with its retaining piece 98a engaging the operating end 90a of the charge lever 90 that has reached the charged position to retain the charge lever 90 in its charged position. When the shutter release button 65 is depressed, the passive pin 98b of the detent lever 98 is depressed against the influence of spring 99 causing the charge lever 90 to rotate clockwise and disengage the acting end 90a of the charge lever 90 from the retaining piece 98a, thereby releasing the restraint of the charge lever 90 at the charged position.

The retaining piece 98a of the detent lever 98 is adapted to wait with its side inclined across the locus or path of movement of the acting end 90a of the charge lever 90 such that the acting end 90a can pass the retaining piece 98a advancing the latter against the force of spring 99 as the acting end 90a is moved in a clockwise direction from its released position to its charged position and that immediately after the acting end 90a of the charge lever 90 passed beyond the retaining piece 98a, the retaining piece 98a returns under the influence of spring 99 to engage the acting end 90a of the charge lever that has arrived at its charged position.

The film speed setting plate 56 of the film speed setting mechanism 58 is formed at its outer periphery with a film speed setting cam 56c between the aforementioned light entrance restricting aperture 56a and the sector gear 56b. The film speed setting plate 56 is set to an appropriate rotary position corresponding to the speed of the film being used, by the operation of the film speed setting knob 57 (FIGS. 3 and 4). The film speed setting cam 56c provides, upon flash photography, information of the film speed to a follow focus mechanism 101 (FIG. 8) which determines the diaphragm aperture in accordance with a camera-to-object distance or the focusing of the camera objective lens.

Figure 7:
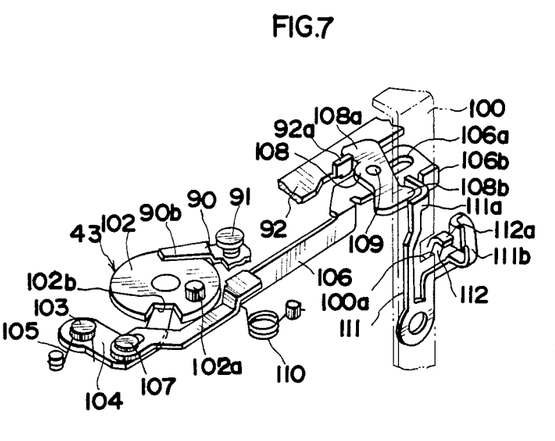
FIG. 7 is a fragmental perspective view of a film wind-up mechanism at the top of the camera.

The upper film wind-up mechanism 43 into which the passive end 90b of the charge lever 90 extends and a portion of which is shown in FIG. 7 includes a charge plate 102 which is rotated in the counterclockwise direction by one rotation in response to a film wind-up operation. The charge plate 102 carries a pin 102a and the passive end 90b of the charge lever 90 extends into the locus of the rotation of the pin 102a. With this arrangement, when the charge plate 102 rotates counterclockwise in response to the film wind-up operation, the passive end 90b of the charge lever 90 is advanced by the pin 102a on the charge plate 102 and the charge lever 90 turns to its charged position shown in FIGS. 4 to 6 to charge or cock the lens position control device 35.

The charge plate 102 has formed in its periphery an engaging recess 102b which, upon completion of a film wind-up operation, receives a wind-up stopping pawl 104 which is pivotably supported by a pin 103 independently thereof and which is urged counterclockwise under the influence of a spring 105 acting thereon and enters the recess 102b to lock the charge plage 102 and stop the wind-up operation. The wind-up stopping pawl 104 is connected by a pin 107 with one end of a wind-up stopping linkage rod 106 which is guided by a supporting pin 109 extending through a slide slot 106a in the rod 106 and is urged, by a spring 110, leftwards as viewed in FIG. 7 with a bent portion or upstanding tab 106b engaging the passive arm 111a of a shutter release lock assisting lever 111, from the opposite side from the acting end 108b of a charge linkage plate 108. The assisting lever 111 is located in the vicinity of the shutter release plate 100. The charge linkage plate 108 is responsive to a charging or cocking operation with its passive end 108a engaging the upstanding piece 92a at an edge of the charged linkage rod 92.

The shutter release lock assisting lever 111 is provided with an operating arm 111b opposing the back of a detent piece 112a of a shutter release lock lever 112 which is mounted in the vicinity of the shutter release plate 100. The detent piece 112a is adapted to enter and retract from a recess 100a formed at a side of the shutter release plate 100. The charge linkage plate 108 is urged in the counterclockwise direction as viewed in FIGS. 5 and 7 by a spring (not shown) which is stronger than the aforementioned spring 110. In the charged condition shown in FIG. 5, the charge linkage plate 108 assume a position to which it has been rotated counterclockwise with the leftward movement of the charge linkage rod 92. The acting end 108b of the charge linkage plate 108 pushes rightward and there holds the passive arm 111a of the shutter release lock assisting lever 111 along with the upstanding tab 106b of the wind-up stopping linkage rod 106 against the influence of spring 110. Accordingly, the wind-up stopping linkage rod 106 maintains the wind-up stopping pawl 104 in the condition engaging the recess 102b of the charge plate 102 to block another film wind-up operation. In this condition, the operating cam 11b of the shutter release lock assisting lever 111 releases the pushing action on the detent piece 112a of the shutter release lock lever 112, which has moved to a position to disengage its detent piece 112a from the recess 100a of the shutter release plate 100, under the influence of a spring (not shown) acting thereon in the clockwise direction, thereby enabling a shutter release operation with the depression of the shutter release plate 100 (FIG. 7).

The above describes the construction of the lens position control device 35 and the principal mechanisms associated therewith and its operation is hereinafter described. When the shutter release button 65 is depressed in the charged condition as shown in FIGS. 4 to 7, the shutter release plate 100 is also depressed and a main switch (not shown) is turned on to supply power to the range finder device 27 and energize the electromagnet 42 so that the electromagnet 42 attracts the armature 83 that has been in forced contact therewith and at the same time the range finder device 27 produces an electric signal representative of the distance from the camera to an object at which the camera is directed. On the other hand, the detent lever 98 is rotated clockwise as viewed in FIG. 6 through its passive pin 98b to release the restraint of the charge lever 90. By this release, the charge lever 90 under action of spring 96 is rotated countercloskwise advancing the charge linkage rod 92, the charge linkage lever 94 and the second sector 75 integral therewith. The counterclockwise rotation of the second sector gear 75 is followed by the rotation of the first sector gear 72 through spring 74 to rotate the partially non-toothed gear 71 clockwise. Following the clockwise rotation of the gear 71, the lens position control cam plate 39 rotated clockwise under the influence of the spring 40 with its speed being governed and regulated at a predetermined value by the anchor 80 and the escapement wheel 79 engaged thereby and coupled with the second sector gear 75 through intermediate gears 76 and 77 and gear 79.

The clockwise rotation of the lens position control cam plate 39 displaces the focusing lens element 9c forwardly by means of the cam-plate periphery cam 39a and the interlocking member 38. As the focusing lens element 9c is being shifted, the range finder device 27 receives an electric signal representative of each displaced position of the focusing lens element 9c through the slide contact 125 being in contact with the corresponding one of the plurality of fixed contacts, and compares the electric signal with the signal representative of the object distance or affecting a calculation with the two signals until the two signals coincide with each other, at which time the range finder device 27 generates a focus detection signal to deenergize the electromagnet 42.

The deenergized electromagnet 42 releases the armature 42. At that time, the urging lever 86 has been released from the depressing operation of the operating pin 39e due to the clockwise rotation of the lens position control cam plate 39 and the spring 87 acting between the urging lever 86 and the detent member 41 has been unloaded (released its tension). Thus, the detent member 41 is rotated counterclockwise under the influence of the spring 85 and its engaging end portion 41a is brought into engagement with any of the plurality of restraining teeth 39b on the periphery of the lens position control cam plate 39 to lock the latter at the rotation position at that time, and to stop the focusing lens element 9c at its most in-focus position.

In spite of the braking of the rotation of the lens position control cam plate 39, the partially non-toothed gear 71 is rotated to its terminal position.

When the object distance is infinite, the cam plate 39 is rotated to its terminal position without the deenergization of the electromagnet 42 interrupting the rotation of the cam plate 39, which, at its terminal position, engages its peripheral stepped portion 39c with the engaging end portion 41a of the detent member 41. Thus, the focusing lens element 9c is displaced to the infinity-focused position.

By the above operations, the position of the focusing lens element 9c is controlled for picture taking.

After a lapse of a predetermined period which is longer than the period necessary for the focusing of the lens, from the depression of the shutter release plate 101, the electric shutter operates and a picture is taken.

With the rightward movement of the charge linkage rod 92 following or in response to the counterclockwise rotation of the charge lever 90 in response to the shutter release operation, the charge linkage plate 108 having its passive end 108a in engagement with the upright tab 92a of the rod is rotated clockwise against a spring (not shown) acting thereon, and releases the depressing force in the rightward direction as viewed in FIG. 7, through its operating end 108b to the passive arm 111a of the shutter release lock assisting lever 111 and the upright tab 106b of the wind-up stopping linkage rod 106. Thus, the wind-up stopping linkage rod 106 tends to move leftwards under the action of spring 110 rotating the assisting lever 111 counterclockwise through the upright tab 106b. However, at that time, the assisting lever 111 pushes, through its operating arm 111b, the detent piece 112a of the release lock lever 112 leftwards as viewed in FIG. 7 but only for the distance to bring the detent piece 112 into engagement with the side edge of the shutter release plate 100. Accordingly, when the shutter release plate 100 is being depressed, the wind-up stopping linkage rod 106 is not moved leftwards substantially with the wind-up stopping claw 104 being still in engagement with the entering recess 102b of the charge plate 102.

After the completion of photography, when the shutter release button 65 is released and the shutter release plate 100 is returned upwardly by the force of a spring (not shown), the detent piece 112a comes into alignment with and enters the engaging recess 100a on the side edge of the shutter release plate 100 to prevent another shutter releasing operation and enable the leftward movement of the wind-up stop linkage rod 106, which rotates the wind-up stopping claw 104 clockwise against the force of spring 105. As a result, the wind-up stopping claw 104 is disengaged from the recess 102b of the charge plate 102 to release the stoppage of film wind-up operation and enable the next film wind-up operation.

If the film wind-up operation is made under this condition, the mechanisms are brought into the charged condition as shown in FIGS. 4 to 7 and a photographing operation as described above may be repeated.

Figure 8:
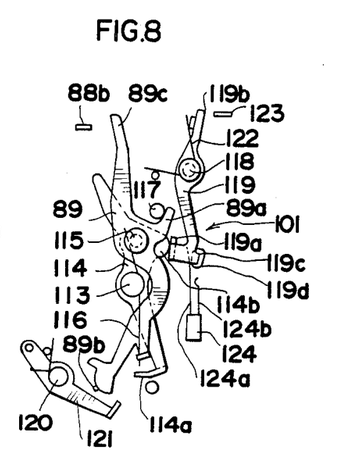
FIG. 8 is a front elevational view of a follow-focus diaphragm adjusting mechanism.

The follow focus mechanism 101 includes a film speed signal lever 114 which, as shown in FIG. 8, is pivotally mounted on the shutter supporting plate 12 by a stud 113. The distance signal lever 89 is pivotally supported on the film speed signal lever 114 by a pin 115. The film speed signal lever 114 is formed at its lower end with a bent portion 114a which extends to oppose the film speed setting cam 56c of the film speed setting plate 56. By means of a spring 116, wound around a stud 113 and tensioned between the distance signal lever 89 and pin 115, the film speed signal lever 114 urges the distance signal lever 89 on the film speed signal lever 114 in the counterclockwise direction as viewed in FIG. 8 such that the side arm 89a of the lever 89 abuts against the fixed pin 117 on the shutter supporting plate 12 to stabilize the distance signal lever 89. The film speed signal lever 114 is urged oppositely in the clockwise direction as viewed in FIG. 8 and its passive portion 114b on its side abuts against the bent piece 119a at the lower end of the follow flash switching lever 119 which is pivotally supported on the shutter supporting plate 12 by stud 118. Thus, the film speed signal lever 114 is also stabilized.

The distance signal lever 89 carries at its lower end a diaphragm control cam 89b which extends into the path of rotation of a diaphragm driving lever 121 which in turn is pivotally supported on the shutter supporting plate 12 by a stud 120. Thus, the distance signal lever 89 controls the amount of movement of the diaphragm driving lever 121 in the process of opening the diaphragm aperture to thereby control the amount of opening of the diaphragm aperture, in accordance with the position of the distance signal lever 89 relative to the film speed signal lever 114.

The follow focus switch lever 119 is urged clockwise by spring 122, as viewed in FIG. 8, and has its upper end 119b opposing a photography mode switching member 123. In a normal photography condition, the photography mode switching member 123 is retracted from the upper end 119b and the follow focus switching lever 119 maintains, through its bent portion 119a, the film speed signal lever 114 at the angular position shown in FIG. 8 against the influence of spring 116 so that the relative positions of the stud 115 and pin 117 at that time keeps the upper end of the distance signal lever 89 greatly spaced from the free end of the focusing linkage lever 88. As the result, the focusing signal lever 89 does not advance the focusing linkage lever 88 into the path of rotation of the operating pin 39e' on the lens position control cam 39, nor is the focusing signal lever 89 affected by the movement of the distance linkage lever 88 which is pushed by the operating pin 39e' through the cam periphery 88a.

In the flash photography condition, the photography condition switching member 123 has been moved leftwards as viewed in FIG. 8 pushing the upper end 119b of the follow focus switching lever 119 against the influence of spring 122 so that the lever 119 has been rotated counterclockwise and the bent piece 119a has been moved rightwards with the film speed signal lever 114 having been rotated clockwise following the bent piece 119a under the influence of the spring 116. At this time, due to the displacement of the stud 115 relative to the pin 117, the arm 89a of distance signal lever 89 is greatly spaced from the pin 117 and is rotated counterclockwise by the spring 116 to push the free end 88b of the focusing linkage lever 88 leftwards such that the cam periphery 88a of the focusing linkage lever 88 is brought into the path of rotation of the operating pin 39e' on the lens position control cam plate 39.

In this condition, the focusing linked lever 88 is turned in response to the rotation of the lens position control cam plate 39 through the coaction of the cam periphery 88a of the lever 88 and the operating pin 39e', and the movement of the lever 88 is transmitted to the distance signal lever 89 as representing information of an object distance. Accordingly, the diaphragm control cam 89b receives information of the set film speed and the object distance and controls the diaphragm aperture for flash photography in accordance with the set film speed and the object distance.

Below the follow flash switching lever 119 is disposed a shutter speed change-over switch 124 which is provided in an automatic exposure control circuit (not shown). The switch 124 has one contact 124a opposing bent piece 119c at the lower end of the follow flash switching lever 119. In a normal photography condition as shown in FIG. 8, the contact 124a is pushed leftwards out of contact with the other contact 124b through an insulating tube covering thereon, to an off state so that shutter speed is determined in accordance with an object brightness and a set diaphragm aperture value. In contact, when the flash photography is selected, the counterclockwise rotation of the follow flash switching lever 119 at the time of switching to the flash photography condition, moves the bent piece 119c rightwards and releases the contact 124a so that the contact 124a returns into pressing engagement with the contact 124b to close the switch 124 and the shutter speed is set to a predetermined value for the flash photography.

Figure 9:
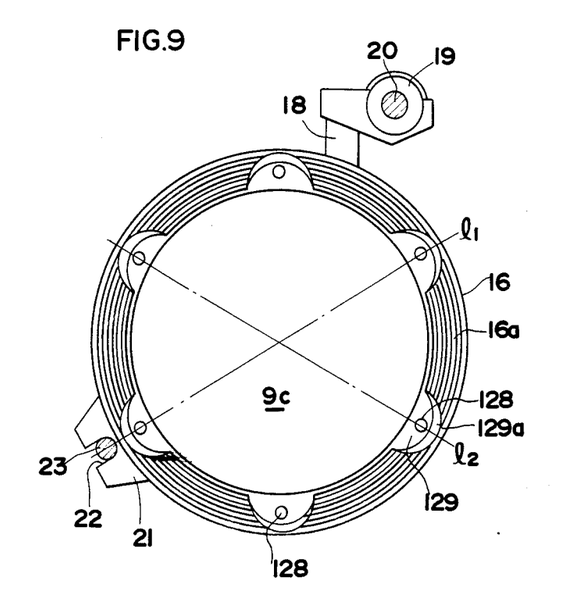
FIG. 9 is a rear elevational view of the focus adjusting lens.

The support frame 16 for the focusing lens element 9c located at the rearmost of the objective lens 9 is molded of a synthetic resin material. The metal mold used in the molding is formed with holes through which the synthetic resin material is injected and pin-shaped portions are formed on the molded part integrally therewith by the synthetic material filling the holes. Those pins which are known as ejector pins, are cut off after the molding and the molded product is finished. The reference numeral 128 in FIG. 9 denotes the traces where the ejector pins have been removed. The ejector pins are located on the plane facing to the exposure aperture window 5 of the camera body 1 and along the diagonal lines 1 and 2 of the exposure frame or picture frame as shown by the traces 128 in FIG. 9 where the ejector pins have been removed. Additionally, the scooped out or recessed portion around each ejector pin formed portion is formed with a wall slanted more acutely than the light blocking wall 16a.

Figure 10:
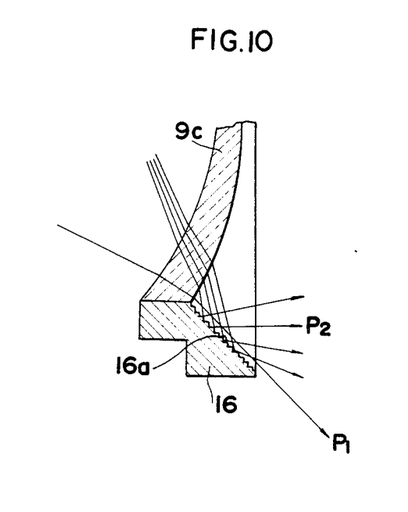
FIGS. 10 and 11 are explanatory schematic illustrations of the effect of and the avoiding measures for detrimental light.

Thos considerations are given for the following reasons. To achieve greater compactness in a 35 mm lens shutter type camera than in conventional camera it is effective to design the lens barrel portion as small as possible as well as to locate the objective lens as close as possible to the exposure aperture window so that the objective lens barrel will not greatly project from the camera body 1. However, at the focusing lens element 9c of the objective lens 9 that is positioned closest to the exposure aperture window 5, the light rays P1 emerging from the lens element along the diagonal lines, as shown in FIG. 10, are of extremely acute angles with the detrimental light rays P2 which are at more acute angles to the optical axis. Hence, it is likely to occur that the light rays reflected at the light blocking wall 16a of the lens supporting frame 16 reach the exposure aperture window 5 and cause flares and ghosts in the picture. Such occurrence of flares and ghosts may be normally avoided by the blockage of the detrimental rays by the light blocking frame 130 provided as shown in FIG. 3. However, such a frame 130 does not work effectively for the light rays emanating along the diagonal lines of the exposure frame or picture frame although it may work well for the rays emanating along the long and short sides of the exposure frame.

Figure 11:
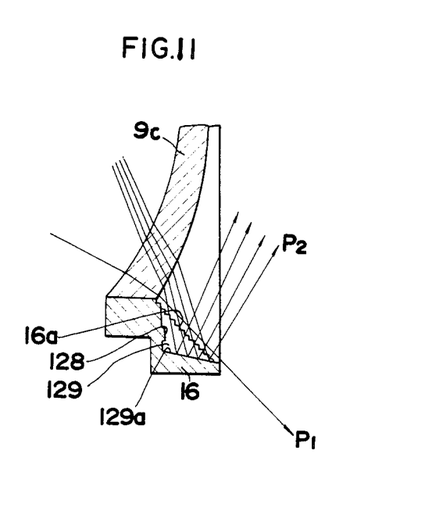

As a result of the above, the slanted circular wall 129a at the recessed portion 129 in the lens supporting frame 16 forms an extremely acute angle with the optical axis in comparison with the light blocking wall 16a as shown in FIG. 11 so that the detrimental light rays P2 are reflected at extremely sharp angles of reflection and do not reach the exposure aperture window 5. Thus, the flare and ghost due to the light P2 are reliably prevented.

A preferred embodiment of the present invention has been described above. However, the present invention may be applied to various cameras without restriction with respect to the type of focusing of the objective lens. In the above embodiment, the focusing was made by the movement of the rearmost one of the two rear lens elements 9b and 9c. But, another type of focusing may be employed. With reference to the lens arrangement of the above described embodiment, the present invention may be applied to the lens type that adjusts its focus by the movement of the front lens 9a. In that case, a movable member integral with the frame for supporting the front lens 9a may be constructed to extend through the shutter supporting plate 12 and interrelated with the lens position control device 15. In any case, it is attained easily and without requiring much space to interrelate the focusing of the objective lens with the lens position control device 35 located in the space 34 surrounded by the camera obscura 8, the range finder device 27 thereabove, and the film cartridge chamber 2 and the spool chamber 3 on both sides. Further, the cam periphery on the cam plate 39 may be stepped to effect zone focusing or the cam plate 39 may be formed in place of the peripheral cam with a cam slot or hole receiving the follower pin 38b.

According to the present invention, the lens position control device is disposed not around the objective lens projecting from the camera body, but in the space which is surrounded by the camera obscura of the camera body, the range finder device thereabove, and the film cartridge chamber and the spool chamber on opposite sides, and which occurs as a dead space in the conventional camera. In addition thereto, the upper wall of the spool chamber is formed at a lower level than the upper wall of the film cartridge chamber and the range finder device is located on the plane coextensive with the upper wall of the spool chamber. Thus, a highly compact 35 mm lens shutter camera with automatic focusing is provided.

Particularly, in the lens position control device, an axially movable focusing lens element is drive coupled to the periphery cam of the lens position control cam plate that is rotatably supported by a stud or pin extending perpendicularly to the optical axis so that the axial position of the focusing lens element is controlled by controlling the rotational position of the lens position control cam plate in accordance with a distance or focus detection signal. Thus, the lens position control device is substantially flat, which is advantageous for the arrangement of the device in the space above the camera and within the camera body in the achievement of a camera as compact as possible. Moreover, the lens position control cam plate is reliably coupled with the focusing lens element, effecting lens position control with high accuracy and stability.

What is claimed is:

1. An automatic focusing camera for use with 35 mm size film contained in a film cartridge, said camera comprising:

an objective lens including an axially movable focusing lens;

a film cartridge chamber for housing said film cartridge;

a spool chamber for accommodating a spool for taking up exposed film transported from said film cartridge chamber;

means for forming an exposure aperture (5);

a camera obscura disposed between said film cartridge chamber and spool chamber and affording a light path through which objective light passes and reaches said exposure aperture;

a rear cover (62) transferable between closed and open positions covering and uncovering said film cartridge chamber, said spool chamber and said exposure aperture, respectively;

a film pressure plate (64) provided on said rear cover for resiliently abutting said film located at said exposure aperture;

upper and lower gap forming means (1a) disposed above and below said exposure aperture for forming a gap between said respective gap forming means and said film pressure plate respectively, said gap allowing passage of said film;

upper and lower light tight means (1c) disposed above and below said upper and lower gap forming means for forming a light tight structure together with upper and lower end portions of said rear cover, respectively;

an automatic range finder unit producing an output signal upon range determination;

a viewfinder arranged above the level of said upper light tight means (1c); and a lens position control mechanism for causing the axial movement of said focusing lens in response to a release operation and stopping the movement thereof in response to the output signal from said automatic range finder unit, said lens position control mechanism being housed in the space delineated by said camera obscura, said viewfinder, said film cartridge chamber, and said spool chamber, and the height of the upper wall (3a) of said spool chamber being lower than that of the upper wall (2a) of said cartridge chamber.

2. An automatic focusing camera as set forth in claim 1 wherein said automatic range finder unit is disposed on a plane at the level of the top end surface of said spool chamber.

3. An automatic focusing camera as set forth in claim 6 wherein said lens position control mechanism includes cam means supported by a pivot (37) extending perpendicularly to the optical axis and rotatable from a charged position toward a released position in response to a release operation, latch means for stopping the movement of said cam means after a predetermined lapse of time from the commencement of the movement of said cam means in response to the output signal from said automatic range finder unit, and a control lever in drive coupling relationship with said cam means and said focusing lens so as to adjust the position of said focusing lens in accordance with the amount of the movement of said cam means.

4. An automatic focusing camera as set forth in claim 3 further comprising a lens supporting member supporting said focusing lens and means for urging said lens supporting member from one end of its movable range to an opposite end thereof and wherein said control lever unidirectionally engages said lens supporting member to restrict the amount of the movement thereof.

5. An automatic focusing camera as set forth in claim 4 further comprising a fixed rod parallel with the optical axis of said objective lens and wherein said lens supporting member is slidably supported by said fixed rod.

6. An automatic focusing camera as set forth in claim 5, wherein said objective lens includes a front lens element and said focusing lens provided as a rear lens element, said front lens element being fixed to the body of the camera.

7. An automatic focusing camera as set forth in claim 1, wherein said height of the upper wall of said spool chamber is substantially at the same level as that of said upper light tight means.

8. An automatic focusing camera for use with a film contained in a film cartridge comprising:
- a body member including a camera obscura with a front opening and an exposure aperture (5), a film cartridge receiving chamber, and a film take-up spool accommodating chamber located at respective opposite sides of and extending above the top of said camera obscura;
- an objective lens registering with said camera obscura front opening and including an axially movable focusing lens element;
- a rear cover (62), movable between closed and open positions covering and uncovering said body member;
- a film pressure plate (64) provided on said rear cover (62) for resiliently abutting said film located at said exposure aperture;
- upper and lower gap forming means (1a) disposed above and below said exposure aperture (5) for forming upper and lower gaps between said gap forming means (1a) and said film pressure plate (64) respectively, said gaps allowing the passage of film;
- upper and lower light tight means (1c) disposed above and below said upper and lower gap forming means (1a) for forming a light tight structure together with upper and lower end portions of said rear cover (62) respectively when the rear cover is in the closed position;
- a range finder located in said body member and spaced above said camera obscura and delineating a housing with the opposing sides of said chambers and the top of said camera obscura;
- a viewfinder located in said body member and arranged above the level of said upper light tight means; and
- a focusing lens control mechanism located in said housing and drive coupled to said focusing lens element and responsive to said range finder to effect the shifting of said focusing lens element to a position in accordance with the object determining position of said range finder.

9. The camera in accordance with claim 8 wherein the top of said cartridge receiving chamber is above the level of said spool accommodating chamber.

10. The camera in accordance with claim 8 wherein said control mechanism includes a horizontal base plate supporting the components of said mechanism.

11. The camera in accordance with claim 8 wherein said focusing lens element is biased in a first axial direction and said control mechanism includes a horizontal control cam, follower means engaging said cam and variably limiting the range of axial movement of said focusing lens element means for rotating said cam and means responsive to said range finder for braking said cam.

12. The camera in accordance with claim 9 including a vertical mounting plate supporting said objective lens, said base plate being secured to said mounting plate.

* * * * *